(12) United States Patent
Nuber

(10) Patent No.: US 11,300,201 B2
(45) Date of Patent: Apr. 12, 2022

(54) METHOD AND CONTROL UNIT FOR OPERATING A VEHICLE DRIVE TRAIN

(71) Applicant: ZF Friedrichshafen AG, Friedrichshafen (DE)

(72) Inventor: Andreas Nuber, Tettnang (DE)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 0 days.

(21) Appl. No.: 16/943,399

(22) Filed: Jul. 30, 2020

(65) Prior Publication Data

US 2021/0033190 A1 Feb. 4, 2021

(30) Foreign Application Priority Data

Jul. 31, 2019 (DE) .................. 10 2019 211 405.9

(51) Int. Cl.
*F16H 61/14* (2006.01)
*F16H 61/68* (2006.01)
(Continued)

(52) U.S. Cl.
CPC ........... *F16H 61/143* (2013.01); *F16H 59/36* (2013.01); *F16H 59/70* (2013.01); *F16H 61/682* (2013.01);
(Continued)

(58) Field of Classification Search
CPC .............. F16H 61/143; F16H 61/682; F16H 2061/145; F16H 59/36; F16H 59/70;
(Continued)

(56) References Cited

U.S. PATENT DOCUMENTS

| 8,398,522 B2 | 3/2013 | Bauknecht et al. |
| 8,496,562 B2 | 7/2013 | Arnold et al. |
| (Continued) | | |

FOREIGN PATENT DOCUMENTS

| DE | 4309903 A1 | 5/1994 |
| DE | 10228708 A1 | 1/2003 |
| (Continued) | | |

OTHER PUBLICATIONS

German Search Report DE102019211405.9, dated Mar. 6, 2020. (12 pages).

*Primary Examiner* — Tisha D Lewis
(74) *Attorney, Agent, or Firm* — Dority & Manning, P.A.

(57) ABSTRACT

A method for operating a vehicle drive train (1) includes, during a downshift, disengaging at least one shift element (A through F) from a power flow of the transmission (5), guiding a power transmission capacity of a torque converter lockup clutch (4) to a level at which the torque converter lockup clutch (4) is in a non-slip operating condition during a positive engine override when a rotational speed of a prime mover (2) is guided towards a synchronous speed of a demanded desired ratio, and guiding the power transmission capacity of the torque converter lockup clutch (4)—no later than a point in time of the downshift at which the rotational speed of the prime mover (2) is equal to the synchronous speed of the desired ratio—to a level at which the torque converter lockup clutch (4) is transferred into a continuous slip operation due to torque.

11 Claims, 3 Drawing Sheets

(51) Int. Cl.
*F16H 59/36* (2006.01)
*F16H 59/70* (2006.01)
*F16H 61/682* (2006.01)

(52) U.S. Cl.
CPC .. *F16H 2059/366* (2013.01); *F16H 2059/706* (2013.01); *F16H 2061/145* (2013.01); *F16H 2200/0065* (2013.01)

(58) Field of Classification Search
CPC ......... F16H 2059/366; F16H 2059/706; F16H 2200/0065
See application file for complete search history.

(56) References Cited

U.S. PATENT DOCUMENTS

| | | | | |
|---|---|---|---|---|
| 2002/0006848 | A1* | 1/2002 | Tabata | F16H 61/143 477/32 |
| 2011/0230308 | A1* | 9/2011 | Inoue | F02D 41/023 477/54 |
| 2020/0055519 | A1* | 2/2020 | Moriyama | F16H 61/14 |

FOREIGN PATENT DOCUMENTS

| | | |
|---|---|---|
| DE | 102008000429 A1 | 9/2009 |
| DE | 102009000253 A1 | 7/2010 |

\* cited by examiner

|     | C | D | B | E | F | A |
|-----|---|---|---|---|---|---|
| "1" |   | X |   |   | X | X |
| "2" | X |   |   |   | X | X |
| "3" |   |   | X |   | X | X |
| "4" |   |   |   | X | X | X |
| "5" |   |   | X | X |   | X |
| "6" | X |   |   | X |   | X |
| "7" |   | X |   | X |   | X |
| "8" | X | X |   | X |   |   |
| "9" |   | X | X | X |   |   |
| "R" |   | X | X |   | X |   |

Fig. 2

METHOD AND CONTROL UNIT FOR OPERATING A VEHICLE DRIVE TRAIN

CROSS-REFERENCE TO RELATED APPLICATION

The present application is related and has right of priority to German Patent Application No. 10 2019 211 405.9 filed on Jul. 31, 2019, which is incorporated by reference in its entirety for all purposes.

FIELD OF THE INVENTION

The invention relates generally to a method for operating a vehicle drive train. Moreover, the invention relates generally to a control unit for carrying out the method and to an appropriate computer program product.

BACKGROUND

Vehicle drive trains known from practical experience usually include a prime mover, a transmission, and a driven end. As a starting component, a hydrodynamic torque converter including an associated torque converter lockup clutch is often arranged between the prime mover and the transmission. The torque converter lockup clutch is provided for coupling an impeller to a turbine wheel of the hydrodynamic torque converter. In the engaged condition of the torque converter lockup clutch, a mechanical connection is established between the input side and the output side of the torque converter with the aid of the torque converter lockup clutch. This is the case in operating conditions of a vehicle drive train of the type in which the function of the hydrodynamic torque converter is not necessary in order to avoid hydrodynamic losses in the area of the torque converter.

Moreover, ratio changes take place in known automatic transmissions via the engagement and disengagement of shift elements. In particular during speed-controlled downshifts, during which the power flow in the area of the automatic transmissions is interrupted, a pressure for the actuation of a torque converter lockup clutch is determined depending on the particular applied torque of a prime mover, and a slip of the torque converter lockup clutch, which is to be adjusted during the downshift to be carried out, is determined.

Meanwhile, it has been established, however, that the determination of the pressure, with the aid of which the torque converter lockup clutch is actuated during such a downshift, as well as the possibility of adjusting any slip of the torque converter lockup clutch represent, at this point, a physically false assumption. Due to the above-described approach, the torque converter lockup clutch is acted upon by a pressure that is so high that a damping or decoupling in the area of the hydrodynamic torque converter between the prime mover and the driven end of a vehicle drive train is not possible with the dynamics that are necessary for a high shift quality during an engagement process of a shift element, which is engaged in order to implement the demanded desired ratio, at the synchronous speed of the engaging shift element. As a result, a shift quality and a ride comfort are adversely affected to an undesirable extent.

SUMMARY OF THE INVENTION

Example aspects of the invention provide a method for operating a vehicle drive train, with the aid of which ratio changes and/or gear shifts can be carried out in a transmission with high shift quality. Additionally, a control unit, which is designed for carrying out the method, and a computer program for carrying out the method are to be described.

A method is provided for operating a vehicle drive train during a downshift in a transmission from an actual gear presently engaged in the transmission in the direction of a demanded desired ratio. The vehicle drive train includes a prime mover, a transmission, in which multiple ratios are implementable via the engagement and disengagement of shift elements, a hydrodynamic torque converter including an associated torque converter lockup clutch, and a driven end. During the demanded downshift, at least one shift element, which is engaged into the power flow of the transmission in order to implement the actual ratio presently selected in the transmission, is disengaged from the power flow and the power flow in the transmission is interrupted. Additionally, a power transmission capacity of the torque converter lockup clutch is guided to a level at which the torque converter lockup clutch is present in a non-slip operating condition during a positive engine override. During the engine override, the rotational speed of the prime mover is guided from the synchronous speed of the actual ratio in the direction of the synchronous speed of the desired ratio.

Additionally, the power transmission capacity of the torque converter lockup clutch is guided—at the latest, at the point in time of the downshift at which the rotational speed of the prime mover is equal to the synchronous speed of the desired ratio—to a level at which the torque converter lockup clutch is transferred into a continuous slip operation due to the torque, which can be transmitted via the transmission.

With the aid of the approach according to example aspects of the invention, it is ensured that the rotational speed of rotary masses of the transmission, which are operatively connected to the torque converter lockup clutch, are accelerated during the positive engine override in the direction of the synchronous speed of the desired ratio to be engaged. In the process, drag torques acting in the transmission are also overcome by the torque converter lockup clutch operated in a non-slip manner. As a result, the rotational speed change in the transmission is implemented within short operating times.

Additionally, it is ensured with the aid of the approach according to example aspects of the invention that, during the actuation of the shift element to be engaged, a desired decoupling or damping in the area of the hydrodynamic torque converter between the prime mover and the driven end is achieved due to the torque converter lockup clutch, which is then slipping. This is provided, in particular, for the case in which the rotational speed of the prime mover reaches the synchronous speed of the desired ratio to be engaged. Due to the decoupling, according to example aspects of the invention, of the prime mover from the driven end once the synchronous speed of the desired ratio to be engaged has been reached, torque fluctuations as well as the masses of the driven end to be connected are damped during the engagement or during the engagement process of the shift element to be selected. Therefore, a significant improvement of the shift quality is achieved, in each case, as compared to conventional approaches, according to which speed-controlled downshifts are carried out.

In order to avoid undesirable discontinuities in the progression of the power transmission capacity of the torque converter lockup clutch, the power transmission capacity of the torque converter lockup clutch is raised and/or lowered, in each case in a ramp-like manner, to an applicable torque value and/or pressure value with the aid of a filter, preferably with the aid of a PT1 filter.

As a result, it is achieved, with a low outlay for open-loop and closed-loop control, that the progression of the power transmission capacity of the torque converter lockup clutch is guided, for example, at least approximately hyperbolically or at least approximately asymptotically, in the direction of the particular demanded value. Therefore, the actuation of the torque converter lockup clutch can be carried out in a reproducible manner to the desired extent in each case.

At least one shift element of the transmission, which is engaged into the power flow of the transmission in order to implement the demanded desired ratio, can be actuated in such a way that a defined torque can be transmitted with the aid of the shift element at the point in time at which the rotational speed of the prime mover is equal to the synchronous speed of the desired ratio.

For the case in which the engaging shift element is a form-locking shift element, the engaging shift element, which is engaged once the synchronous speed of the desired ratio has been reached, has full power transmission capacity.

In contrast thereto, in the case of an example embodiment of the engaging shift element as a friction-locking shift element, it is possible that, once the synchronous speed of the desired ratio has been reached, the engaging shift element transmits a defined torque, but does not yet have full power transmission capacity.

If the defined torque corresponds to the torque that is present at the transmission, the demanded downshift can be carried out in the transmission within short shift times in combination with high shift quality.

Moreover, it can be provided that the power transmission capacity of the torque converter lockup clutch is raised and the torque converter lockup clutch is transferred into a non-slip operating condition when it is determined that the desired ratio has been engaged in the transmission. As a result, power losses in the area of the hydrodynamic torque converter, which occur when the torque converter lockup clutch is disengaged or slipping, are avoidable and the vehicle drive train can be operated with high efficiency.

Example aspects of the invention also relate to a control unit, which is designed for carrying out the method according to example aspects of the invention. The control unit includes, for example, means utilized for carrying out the method according to example aspects of the invention. These means can be hardware-related means and software-related means. The hardware-related means of the control unit or of the control device are, for example, data interfaces for exchanging data with the assemblies of the vehicle drive train contributing to the carrying-out of the method according to example aspects of the invention. Further hardware-related means are, for example, a memory for data storage and a processor for data processing. Software-related means can be, among other things, program modules for carrying out the method according to example aspects of the invention.

In order to carry out the method according to example aspects of the invention, the control unit can be operated using at least one receive interface, which is designed for receiving signals from signal transmitters. The signal transmitters can be designed, for example, as sensors, which gather measured quantities and transmit them to the control unit. A signal transmitter can also be referred to as a signal sensing element. In this way, the receive interface can receive a signal from a signal transmitter, via which the receive interface is signaled that a downshift is demanded.

The signal can be generated, for example, by an operator, in that the operator actuates a control element, via which such a determination can be demanded. Moreover, the signal can also be generated by a driving strategy, which is activated and carried out in the area of the control unit or in the area of a further control unit of the vehicle drive train.

The control unit can also include a data processing unit, in order to evaluate and/or process the received input signals or the information of the received input signals.

The control unit can also be designed including a transmit interface, which is designed for outputting control signals to actuating elements. An actuating element is understood to be actuators that implement the commands of the control unit. The actuators can be designed, for example, as electromagnetic valves.

If it is detected by the control unit during the operation of a vehicle drive train that a downshift is demanded in the transmission from an actual ratio presently engaged in the transmission in the direction of a desired ratio, an appropriate demand is output by the control unit.

In this case, the vehicle drive train can include a prime mover, a transmission, in which multiple ratios are implementable via the engagement and disengagement of shift elements, a hydrodynamic torque converter including an associated torque converter lockup clutch, and a driven end.

In order to carry out the downshift, at least one shift element, which is engaged into the power flow of the transmission in order to implement the actual ratio presently engaged in the transmission, is disengaged, by the control unit, from the power flow and the power flow in the transmission is interrupted.

Thereafter, a power transmission capacity of the torque converter lockup clutch is guided, by the control unit, to a level at which the torque converter lockup clutch is present in a non-slip operating condition during a positive engine override. During the positive engine override, the rotational speed of the prime mover is guided, by the control unit, from the synchronous speed of the actual ratio in the direction of the synchronous speed of the desired ratio.

Additionally, the control unit guides the power transmission capacity of the torque converter lockup clutch—at the latest, at the point in time of the downshift at which the rotational speed of the prime mover is equal to the synchronous speed of the desired ratio—to a level at which the torque converter lockup clutch is transferred into a continuous slip operation due to the torque, which can be transmitted via the transmission.

As a result, it is ensured that a demanded downshift can be implemented within short shift times in combination with high shift quality.

The aforementioned signals are to be considered merely as examples and are not to limit the invention. The gathered input signals and the output control signals can be transmitted via a vehicle bus, for example, via a CAN-BUS. The control device or the control unit can be designed, for example, as a central electronic control unit of the vehicle drive train or as an electronic transmission control unit.

The approach according to example aspects of the invention can also be embodied as a computer program product, which, when running on a processor of a control device, instructs the processor from the software point of view to carry out the assigned method steps, which are subjects of example aspects of the invention. In this context, a machine-readable non-transitory medium, on which an above-described computer program product is retrievably stored, is also a subject of example aspects of the invention.

The invention is not limited to the specified combination of features of the independent claims or the claims dependent thereon. In addition, individual features can be combined with one another, provided they arise from the claims, the description of embodiments that follows, or directly from the drawing. References in the claims to the drawings via the use of reference signs is not intended to limit the scope of protection of the claims.

BRIEF DESCRIPTION OF THE DRAWINGS

An exemplary embodiment of the invention is explained in greater detail with reference to the drawings, without being limited thereto.

Wherein:

FIG. 2 shows a shift logic, in table form, of the example transmission shown in FIG. 1.

DETAILED DESCRIPTION

Figure 1:
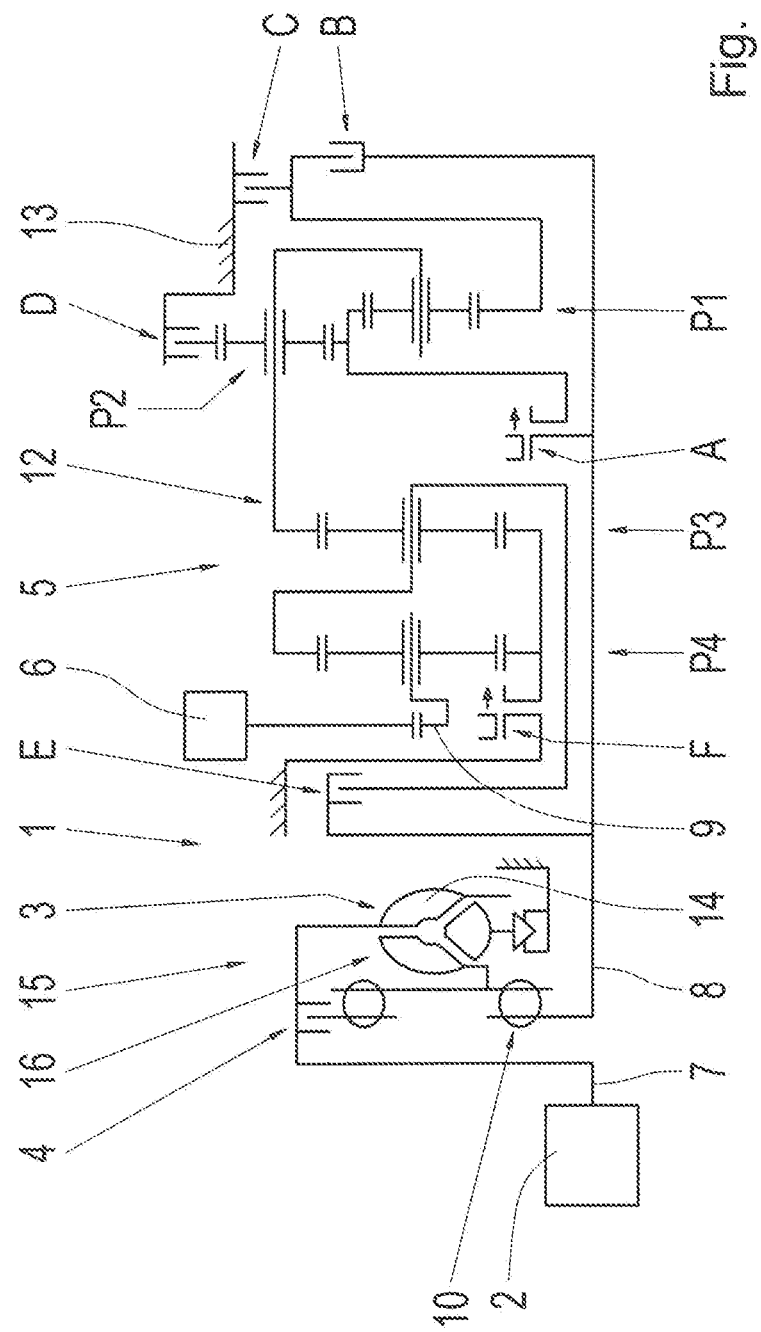
FIG. 1 shows a schematic of a vehicle drive train including a prime mover, a hydrodynamic torque converter with an associated torque converter lockup clutch, a transmission, and a driven end.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a schematic of a vehicle drive train 1 including a prime mover 2, a transmission 5, and a driven end 6. An engine output shaft 7 of the prime mover 2, designed as an internal combustion engine, is operatively connected to a transmission input shaft 8 via a starting component 15. The starting component 15 includes a hydrodynamic torque converter 3 and a torque converter lockup clutch 4 associated therewith. Additionally, a torsional vibration damper 10 is provided on the transmission-input end. The transmission 5 is a multi-stage transmission, which is also known, in principle, from DE 10 2008 000 429 A1. The transmission 5 includes, in addition to the transmission input shaft 8, a transmission output shaft 9, which is connected to the driven end 6.

In addition, the transmission 5 includes four planetary gear sets P1 through P4. The first planetary gear set P1 and the second planetary gear set P2, which are preferably designed as minus planetary gear sets, form a shiftable front-mounted gear set. The third planetary gear set P3 and the fourth planetary gear set P4 represent the main gear set. Additionally, the transmission 5 includes six shift elements A through F, of which the shift elements C, D and F are designed as brakes and the shift elements A, B and E are designed as separating clutches.

The hydrodynamic torque converter 3 and the associated torque converter lockup clutch 4 are arranged, in this case, between the prime mover 2 and the transmission 5. The engine output shaft 7 is an input shaft of the hydrodynamic torque converter 3, which is connected to an impeller 14 of the hydrodynamic torque converter 3. In the present case, the transmission input shaft 8 is equivalent to an output shaft of the hydrodynamic torque converter 3 and is connected to a turbine wheel 16 of the hydrodynamic torque converter 3. In the engaged operating condition of the torque converter lockup clutch 4, the torque converter lockup clutch 4 represents a mechanical coupling between the engine output shaft 7 and the transmission input shaft 8, with the aid of which the hydrodynamic torque converter 3 is locked up and a mode of operation of the hydrodynamic torque converter 3 is shut off.

With the aid of the shift elements A through F, according to the shift logic shown in greater detail in FIG. 2, a selective shifting of nine ratios for forward travel, or nine forward gears "1" through "9", and one ratio for travel in reverse, or one reverse gear "R", can be implemented. In order to implement a ratio in the transmission 5 and/or in order to establish a power flow, three of the shift elements A through F are to be simultaneously transferred into or held in an engaged operating condition in the transmission 5 in each case. The only exception thereto is the fourth ratio "4" for forward travel. For the implementation thereof, it is sufficient that the shift elements E and F are simultaneously engaged into the power flow. The shift element A is left or held in the engaged operating condition in order to improve a spontaneity during the implementation of a demanded upshift starting from the fourth ratio "4" into the fifth ratio "5" or a downshift from the fourth ratio "4" into the third ratio "3". When the fourth ratio "4" is engaged in the transmission 5, the shift element A is essentially load-free.

The shift elements A and F are designed as form-locking shift elements, such as dog clutches, in the present case, in order to reduce drag torques produced by disengaged, friction-locking shift elements during the operation of the transmission 5 as compared to transmissions including only friction-locking shift elements. Since form-locking shift elements are generally transferrable from a disengaged operating condition into an engaged operating condition only within a very narrow differential speed range about the synchronous speed, the synchronization of a form-locking shift element to be engaged is implemented without additional structural modifications, for example, with the aid of approaches known from DE 10 2009 000 253 A1. Form-locking shift elements can be actuated to the desired extent during traction shifts as well as during coasting shifts with the aid of the known approaches. The form-locking shift elements A and F can be designed as constant-mesh shift elements, which are designed with or without additional synchronization.

Figure 3:
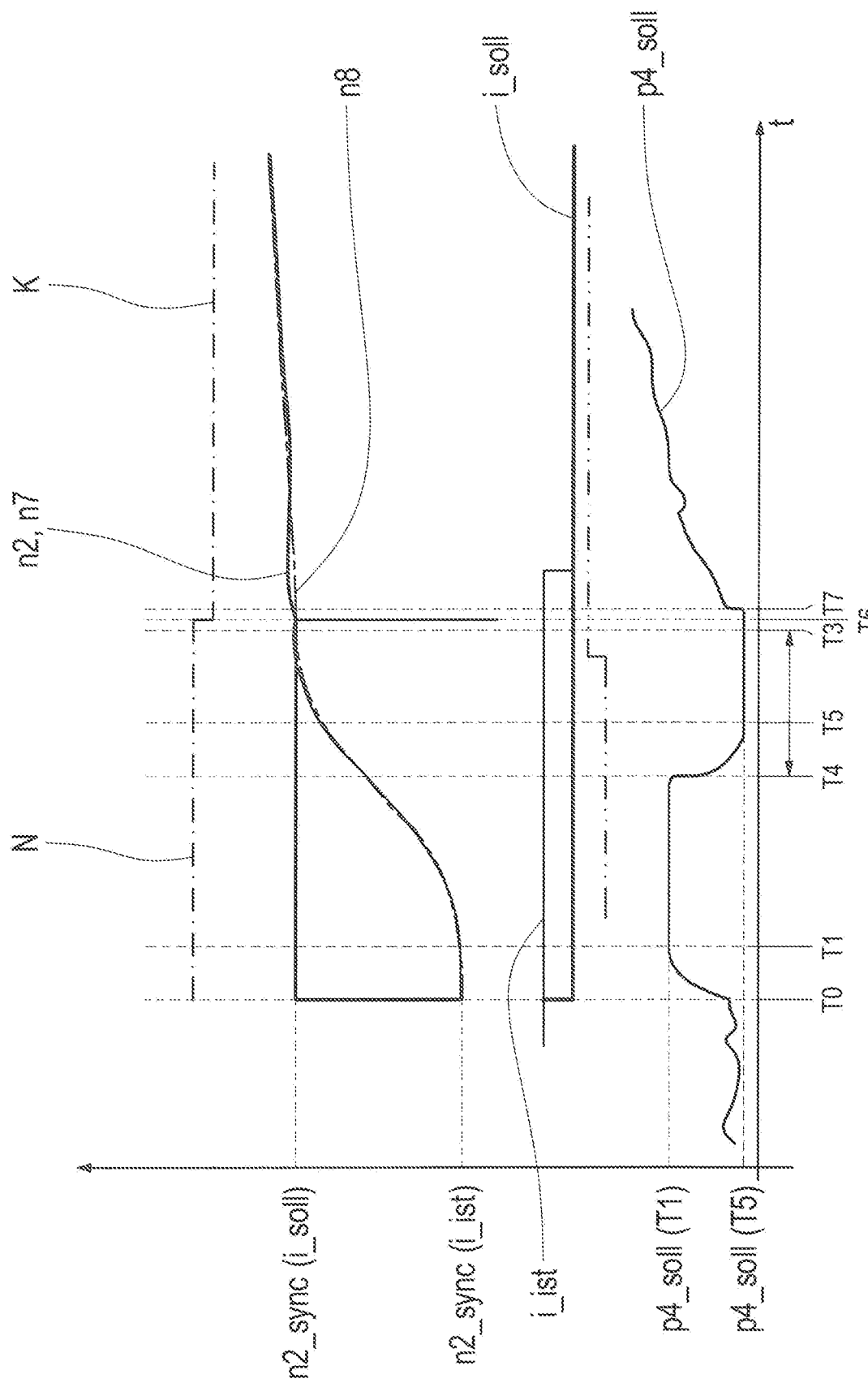
FIG. 3 shows multiple curves of various operating variables of the example vehicle drive train according to FIG. 1.

FIG. 3 shows multiple curves of various operating variables of the vehicle drive train 1 over the time t during a speed-controlled downshift through neutral in the transmission 5, while the power flow between the transmission input shaft 8 and the transmission output shaft 9 is interrupted in the transmission 5.

Before a point in time T0, a demand to carry out a downshift is issued by an operator of a vehicle including the vehicle drive train 1 or by a driving strategy stored in a control unit. During the demanded downshift, one of the ratios for forward travel "9" through "2" presently engaged in the transmission 5, which is referred to in the following as the actual ratio, is to be disengaged and one of the ratios for forward travel "8" through "1" is to be presently engaged in the transmission 5. The particular ratio for forward travel "8" to "1" to be engaged is referred to in the following as the desired ratio i_soll.

In order to be able to carry out the demanded downshift within the shortest possible shift times, in the present case, a shift element presently engaged into the power flow of the transmission 5 in order to implement the actual ratio i_ist is disengaged. As a result, the power flow K between the transmission input shaft 8 and the transmission output shaft 9 is interrupted. In this operating condition, which is also referred to as the neutral operating condition N of the transmission 5, no torque can be transmitted via the transmission 5.

At the start of the downshift process in the transmission 5, a progression of a specified actuating pressure p4_soll of the torque converter lockup clutch 4, i.e., at the point in time T0 in the present case, is raised to a predefined pressure value p4_soll(T1), in a ramp-like manner, to the extent represented in FIG. 3. The specified actuating pressure p4_soll reaches the predefined pressure value p4_soll(T1) at the point in time T1. The pressure value p4_soll(T1) corresponds to a pressure level and to a level of the power transmission capacity of the torque converter lockup clutch 4, at which all torques acting in the transmission 5 during the neutral operating condition N of the transmission 5 and applied at the transmission input shaft 8 are supported in the area of the torque converter lockup clutch 4.

The torques applied at the transmission input shaft 8 in the neutral operating condition N of the transmission 5 are in addition to drag torques acting in the transmission 5 and also inertia torques of rotary masses of the transmission 5 connected to the transmission input shaft 8. The inertia torques occur during a rotational speed change of the input speed n2 of the prime mover 2 from the synchronous speed n2_sync (i_ist) of the actual ratio i_ist in the direction of the synchronous speed n2_sync(i_soll) of the desired ratio i_soll to be engaged. This means, the torque converter lockup clutch 4 is in the non-slip operating condition starting at the point in time of the application of the pressure value p4_soll(T1).

As the downshift process continues to progress, the input speed n2 of the prime mover 2 and, therefore, also a rotational speed n7 of the engine output shaft 7 increase in the idealized manner represented in FIG. 2 in the direction of the synchronous speed n2_sync(i_soll). When the torque converter lockup clutch 4 is engaged, the rotational speed n7 of the engine output shaft 7 is equal to the rotational speed n8 of the transmission input shaft 8.

In the present case, the input speed n2 of the prime mover 2 and the rotational speed n8 of the transmission input shaft 8 reach the synchronous speed n2_sync(i_soll) of the desired ratio i_soll at a point in time T3. In order to be able to carry out the demanded downshift with the highest possible shift comfort and in the most reproducible way possible, a shift element of the transmission 5, which is engaged into the power flow in order to implement the demanded desired ratio i_soll in the transmission 5, is prepared for the engagement already between the points in time T1 and T3.

For the case in which the engaging shift element is one of the form-locking shift elements or constant-mesh shift elements A or F, the constant-mesh shift element is actuated in a timely manner before reaching a synchronous speed and, ideally, is engaged at the point in time T3. Therefore, the power flow is restored in the transmission 5 at the point in time T3 and a drive torque applied by the prime mover 2 is transmitted further via the transmission 5 in the direction of the driven end 6.

If the shift element that is engaging in order to implement the demanded desired ratio i_soll is one of the friction-locking shift elements B, C, D or E, it is possible to prepare the engaging shift element, between the points in time T1 and T3, for the engagement into the power flow of the transmission 5 in such a way that the engaging shift element has a defined power transmission capacity at the point in time T3. The engaging shift element then transmits at least a portion of the torque applied by the prime mover 2 in the direction of the driven end 6. It can also be provided that the engaging shift element already has full power transmission capacity at the point in time T3.

In order to avoid undesirable reaction torques in the vehicle drive train 1 during the downshift, which result from the engagement of the engaging shift element, the specified actuating pressure p4_soll of the torque converter lockup clutch 4 is lowered at a point in time T4 before the point in time T3 in a ramp-like manner or hyperbolically in the direction of a pressure value p4_soll(T5). The specified actuating pressure p4_soll reaches the pressure value p4_soll (T5) at the point in time T5.

Due to the ramp-like lowering of the specified actuating pressure p4_soll, the torque converter lockup clutch 4 transitions into a continuous slip operation at the point in time T3 at the latest due to the applied torque and the lower power transmission capacity of the torque converter lockup clutch 4. As a result, during the actuation of the engaging shift element at the synchronous speed and/or at the point in time T3 of the vehicle drive train 1, a decoupling or damping is achieved in the area of the hydrodynamic torque converter 3 between the prime mover 2 and the transmission 5 and/or the driven end 6. This means, discontinuities in the progression of the torque applied at the driven end 6, which may be caused by the engagement of the shift element in the vehicle drive train 1 in the case of conventionally implemented downshifts, are decoupled or damped in the area of the hydrodynamic torque converter 3 and do not adversely affect a shift quality. This results from the fact that the functionality of the hydrodynamic torque converter 3 is available to the full extent again when the torque converter lockup clutch 4 is slipping.

At a point in time T6, the power flow K in the transmission 5 is restored. In order to subsequently avoid hydrodynamic losses in the area of the hydrodynamic torque converter 3, the specified actuating pressure p4_soll of the torque converter lockup clutch 4 is raised and the torque converter lockup clutch 4 is engaged at a point in time T7 in the manner shown in FIG. 3.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE SIGNS 1 vehicle drive train
2 prime mover
3 hydrodynamic torque converter
4 torque converter lockup clutch
5 transmission
6 driven end
7 engine output shaft
8 transmission input shaft
9 transmission output shaft
10 torsional vibration damper 11 transmission output shaft
12 gear set
13 housing
14 turbine wheel
15 starting component
16 impeller
"1" to "9" transmission ratio for forward driving
A through F shift element
i_ist actual ratio
i_soll desired ratio
K power flow of the transmission
N neutral operating condition of the transmission
n2 rotational speed of the prime mover
n8 rotational speed of the transmission input shaft
n2_sync(i_ist) synchronous speed of the actual ratio
n2_sync(i_soll) synchronous speed of the desired ratio
p4_soll specified actuating pressure of the torque converter lockup clutch
p4_soll(T1) pressure value
p4_soll(T5) pressure value
T0 discrete point in time
T1 discrete point in time
T3 discrete point in time
T4 discrete point in time
T5 discrete point in time
T6 discrete point in time
T7 discrete point in time
t time

The invention claimed is:

1. A method for operating a vehicle drive train (1) that comprises a prime mover (2) comprising an internal combustion engine, a transmission (5) in which multiple ratios ("1" through "9", "R") are implementable via selective engagement and disengagement of shift elements (A through F), a hydrodynamic torque converter (3) comprising a torque converter lockup clutch (4), and a driven end (6), the method comprising:
  initiating a downshift in the transmission (5) from an actual ratio (i_ist) presently engaged in the transmission (5) towards a demanded desired ratio (i_soll);
  during the downshift, disengaging at least one shift element, which is engaged in a power flow (K) of the transmission (5) in order to implement the actual ratio (i_ist) presently engaged in the transmission (5), from the power flow (K) in order to interrupt the power flow (K);
  adjusting a power transmission capacity of the torque converter lockup clutch (4) to a level at which the torque converter lockup clutch (4) is in a non-slip operating condition during a positive engine override, the rotational speed (n2) of the prime mover (2) adjusted from the synchronous speed (n2_sync(i_ist)) of the actual ratio (i_ist) towards the synchronous speed (n2_sync(i_soll)) of the desired ratio (i_soll) during the positive engine override; and
  no later than a point in time (T3) of the downshift at which the rotational speed (n2) of the prime mover (2) is equal to the synchronous speed (n_sync(i_soll)) of the desired ratio (i_soll), adjusting the power transmission capacity of the torque converter lockup clutch (4) to a level at which the torque converter lockup clutch (4) transfers into a continuous slip operation due to torque which is transmittable via the transmission (5).

2. The method of claim 1, wherein adjusting the power transmission capacity of the torque converter lockup clutch (4) to the level at which the torque converter lockup clutch (4) is in the non-slip operating condition comprises raising the power transmission capacity of the torque converter lockup clutch (4) in a ramped manner to an applicable torque value with a filter.

3. The method of claim 2, wherein the filter is a PT1 filter.

4. The method of claim 1, wherein adjusting the power transmission capacity of the torque converter lockup clutch (4) to the level at which the torque converter lockup clutch (4) transfers into the continuous slip operation comprises lowering the power transmission capacity of the torque converter lockup clutch (4) in a ramped manner to an applicable torque value and/or pressure value with a filter.

5. The method of claim 4, wherein the filter is a PT1 filter.

6. The method of claim 1, further comprising actuating at least one other shift element, which is engaged into the power flow (K) of the transmission (5) in order to implement the demanded desired ratio (i_soll), such that a defined torque is transmittable with the at least one other shift element at the point in time (T3) at which the rotational speed (n2) of the prime mover (2) is equal to the synchronous speed (n2_sync(i_soll)) of the desired ratio (i_soll).

7. The method of claim 6, wherein the defined torque corresponds to a torque that is present at the transmission (5).

8. The method of claim 1, wherein adjusting the power transmission capacity of the torque converter lockup clutch (4) to the level at which the torque converter lockup clutch (4) is in the non-slip operating condition comprises raising the power transmission capacity of the torque converter lockup clutch (4) such that the torque converter lockup clutch (4) transfers into the non-slip operating condition in response to the desired ratio (i_soll) being engaged in the transmission (5).

9. A control unit for operating a vehicle drive train (1) that comprises a prime mover (2) comprising an internal combustion engine, a transmission (5) in which multiple ratios ("1" through "9", "R") are implementable via selective engagement and disengagement of shift elements (A through F), a hydrodynamic torque converter (3) comprising a torque converter lockup clutch (4), and a driven end (6), the control unit configured for:
  during a downshift in the transmission (5) from an actual ratio (i_ist) presently engaged in the transmission (5) towards a demanded desired ratio (i_soll), disengaging at least one shift element, which is engaged in a power flow (K) of the transmission (5) in order to implement the actual ratio (i_ist) presently engaged in the transmission (5), from the power flow (K) in order to interrupt the power flow (K);
  adjusting a power transmission capacity of the torque converter lockup clutch (4) to a level at which the torque converter lockup clutch (4) is in a non-slip operating condition during a positive engine override, the rotational speed (n2) of the prime mover (2) adjusted from the synchronous speed (n2_sync(i_ist)) of the actual ratio (i_ist) towards the synchronous speed (n2_sync(i_soll)) of the desired ratio (i_soll) during the positive engine override; and
  no later than a point in time (T3) of the downshift at which the rotational speed (n2) of the prime mover (2) is equal to the synchronous speed (n_sync(i_soll)) of the desired ratio (i_soll), adjusting the power transmission capacity of the torque converter lockup clutch (4) to a level at which the torque converter lockup clutch (4) transfers into a continuous slip operation due to torque which is transmittable via the transmission (5).

10. A control unit, wherein the control unit is configured to carry out the method of claim 1.

11. A computer program product, comprising program code stored on a non-transitory computer-readable data carrier, the program code configured to carry out the method of claim 1 when the program code is executed on a computer or on an appropriate processing unit.

* * * * *